United States Patent [19]

Sackett

[11] Patent Number: 5,027,534

[45] Date of Patent: Jul. 2, 1991

[54] POWER DITCH ROUTER

[76] Inventor: Richard C. Sackett, 7325 Curtis St., P.O. Box 103, Salem, Mich. 48175

[21] Appl. No.: 463,775

[22] Filed: Jan. 5, 1990

Related U.S. Application Data

[63] Continuation of Ser. No. 252,749, Oct. 3, 1988, abandoned.

[51] Int. Cl.$^5$ .............................................. E02F 5/00
[52] U.S. Cl. ........................................ 37/91; 37/189; 56/10.7
[58] Field of Search .................... 37/91, 189; 15/93 B; 56/15.2, 15.5, 249, 255, 256, 10.7

[56] References Cited

U.S. PATENT DOCUMENTS

| | | | |
|---|---|---|---|
| 2,942,360 | 6/1960 | Hawkins et al. | 37/91 |
| 3,217,480 | 11/1965 | Orr | 56/256 |
| 3,684,028 | 8/1972 | Crawford | 56/256 X |
| 4,257,213 | 3/1981 | Brumat | 56/15.5 X |
| 4,459,767 | 7/1984 | Cartner | 15/93 B X |
| 4,715,169 | 12/1987 | Ould | 56/256 X |
| 4,724,662 | 2/1988 | Griandenoto et al. | 56/256 |

Primary Examiner—Clifford D. Crowder
Assistant Examiner—Moshe I. Cohen
Attorney, Agent, or Firm—Harness, Dickey & Pierce

[57] ABSTRACT

A powered ditch router for clearing the overgrowth from road side drainage ditches is disclosed. The router includes a power shaft, a plurality of discs attached to the shaft for rotation therewith, and a number of cutting teeth are spaced about the periphery and sides of the discs for cutting the overgrowth. The router is mountable to a tractor for operation through a ditch. The overgrowth, when cut, can be deposited along side one edge of the ditch for subsequent pickup and disposal.

3 Claims, 1 Drawing Sheet

POWER DITCH ROUTER

This is a continuation of U.S. patent application Ser. No. 252,749, filed Oct. 3, 1988, entitled POWER DITCH ROUTER, now abandoned.

BACKGROUND AND SUMMARY OF THE INVENTION

This invention relates to a cutting machine for clearing overgrowth from road side drainage ditches and more specifically to a power ditch router for clearing this overgrowth.

A major problem with maintaining rural roads, is maintenance of the drainage ditch along side the road. Frequently these ditches will become overgrown with grass, weeds, small bushes and the like such that the flow of drainage water is restricted. No easy means of clearing out this overgrowth currently exists. Mowers typically require a flat surface along the entire width of the mower for cutting overgrowth. This prevents a mower from being used effectively at the bottom of a drainage ditch. Accordingly, it is an object of this invention to provide a power ditch router for cleaning the overgrowth in the bottom of a road side drainage ditch.

The power ditch router of this invention includes a power shaft having a number of horizontally spaced discs attached to the shaft for rotation therewith. At the outer edges of these discs are a number of cutting teeth for cutting the overgrowth. The discs are of progressively larger diameter with the smallest diameter discs at each end and the largest diameter disc in the middle. This allows the router to reach the bottom V-shaped portion of a drainage ditch without cutting into the side walls of the ditch. The router can be mounted to a conventional tractor and hydraulically driven from the tractor hydraulic system or it can be mechanically driven from the tractor power-take-off. The router can be positioned relative to the ditch such that the overgrowth is cut short, yet the root system remains so that the soil will not be eroded by the drainage water. The router can also be positioned to remove the top layer of soil and the plant roots thereby leaving no growth. The router can be operated at an oblique angle relative to the ditch such that the removed overgrowth can be deposited along the side of the ditch as opposed to in the bottom of the ditch.

Alternatively, the router can be operated perpendicularly to the ditch such that parallel rows of grass between the discs will remain intact in the ditch. The router can also be moved transversely across the ditch. This motion is useful in removing small saplings where more than one pass by the router is necessary to completely remove the tree.

Further objects, features and advantages of the invention will become apparent from a consideration of the following description and the appended claims when taken in connection with the accompanying drawings.

DETAILED DESCRIPTION OF THE DRAWING

Figure 1:
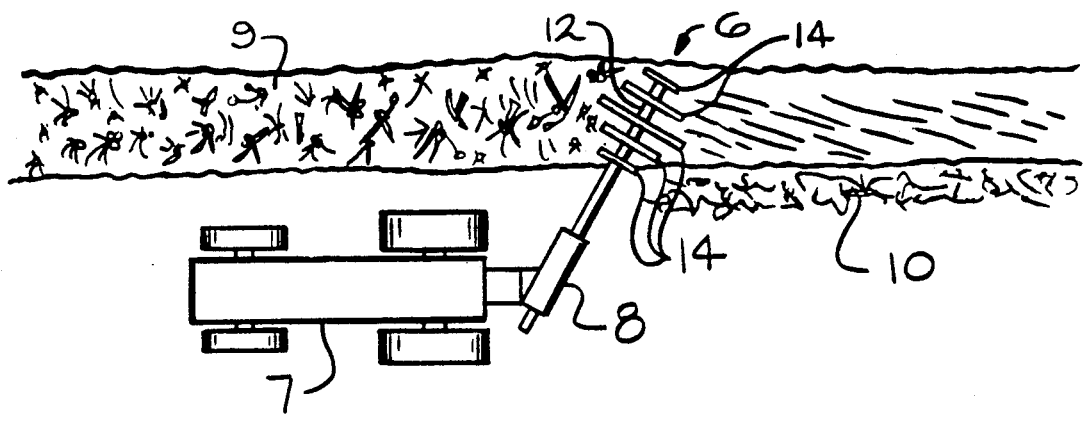
FIG. 1 is a plan view showing the power ditch router connected to a tractor and being operated in a ditch.

Referring now to the drawing, the power ditch router of this invention is shown in FIG. 1 generally at 6. The router 6 is mounted on a motive power unit, such as a tractor 7, by an adjustable arm 8. The router is shown in operation clearing the overgrowth from ditch 9 and depositing the overgrowth 10 along the side of the ditch.

Figure 2:
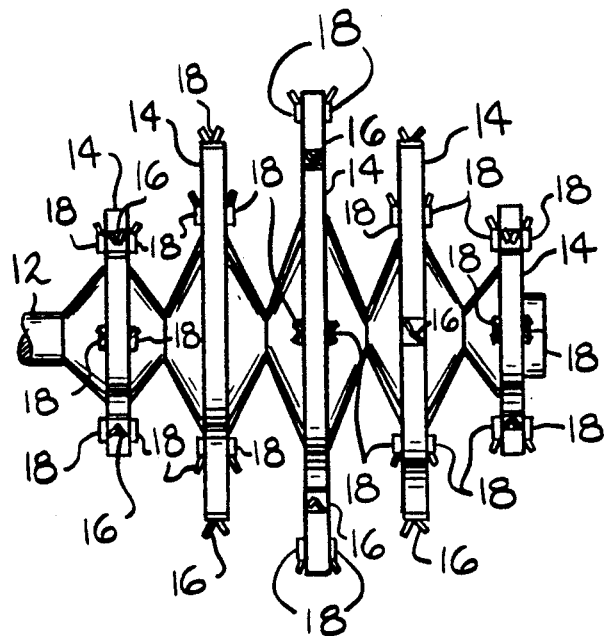
FIG. 2 is a side view of the drive shaft and discs of the power ditch router according to this invention.
Figure 3:
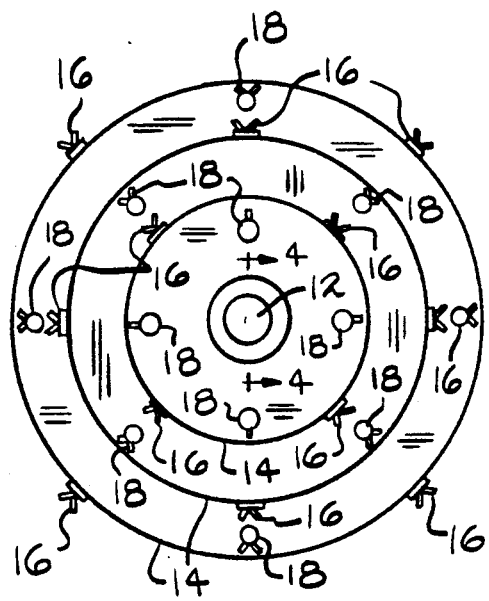
FIG. 3 is an end view of the drive shaft and discs shown in FIG. 2.

Details of the router design are shown in FIGS. 2 and 3. The router includes a drive shaft 12 which has a plurality of steel discs 14 attached to shaft 12 for rotation therewith. Discs 14 are axially spaced apart on shaft 12 and are of progressively larger diameters from the discs at each end of the shaft to the center disc. As shown, there are an odd number of the discs. If an even number of discs is used, the two center discs can be of the same diameter.

Attached about the periphery of the discs 14 are a plurality of hardened steel cutting teeth 16. Spaced apart on each side of the discs 14, near the periphery, are a plurality of hardened steel cutting teeth 18. When rotated, the cutting teeth 16 and 18 serve to cut the overgrowth in the ditch. The router can be positioned above the ground at a height such that the roots of the overgrowth are not disturbed to provide ground cover to prevent erosion of the soil in the ditch. Alternatively, the router can be positioned to remove the roots of the overgrowth and re-slope the ditch.

Also shown in FIG. 2, are support braces 20 between the discs and shaft which resist lateral loads acting upon the side of the discs 14. FIG. 3 shows a end view of the shaft in FIG. 2 showing the discs 14, periphery cutting teeth 16 and side cutting teeth 18.

Figure 4:
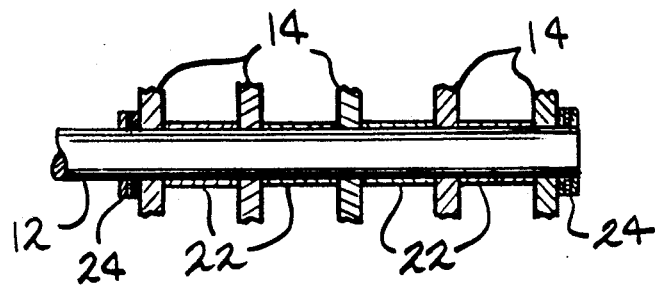
FIG. 4 is a sectional view of the drive shaft of the power ditch router as seen substantially along line 4—4 of FIG. 3.

FIG. 4 is a section of the drive shaft 12 and discs 14 showing spacers 22 between each disc and end stops 24.

As shown in FIG. 1, the shaft 12 can be oriented at an angle to the ditch such that the router covers the entire width of the ditch 9. For a ditch as wide as the router, the shaft 12 can be oriented perpendicularly to the longitudinal direction of the ditch. For even wider ditches, the router can be moved laterally across the ditch while moving longitudinally through the ditch. The router is preferably operated at an angle relative to the longitudinal direction of the ditch, such that the cut overgrowth is deposited along side the ditch rather than behind the router in the ditch. This aids in later pickup and disposal of the cut overgrowth. The shaft 12 is rotated in a clockwise direction, as viewed from the top of the FIG. 1, for depositing the overgrowth behind the router as shown.

The router includes a drive means for rotating the drive shaft 12. This drive means can include a hydraulic motor which is connectable to the tractor hydraulic system or the drive means can include a drive shaft for connection with the tractor power-take-off.

In operation, the ditch router 6, after mounting to the tractor 7, is positioned in ditch 9 as shown in FIG. 1. If the ditch router 6 is wider than ditch 9, the router drive shaft 12 can be positioned at an oblique angle relative to the longitudinal axis of the ditch. With the drive shaft 12 and discs 14 rotating, the tractor is moved forward along side the ditch carrying the router through the ditch to cut overgrowth in the ditch.

The overgrowth is deposited alongside the ditch when the drive shaft 12 is at an oblique angle to the ditch. If shaft 12 is perpendicular to the longitudinal axis of the ditch, the cut overgrowth will be deposited in the ditch.

The router can be operated at a height above the ground such that the roots of the overgrowth are not disturbed and the roots will prevent erosion of the soil in the ditch. Alternatively, the router can be used to remove the roots and re-shape the ditch contour.

It is to be understood that the invention is not limited to the exact construction or method illustrated and described above, but that various changes and modifications may be made without departing from the spirit and scope of the invention as defined in the following claims.

What is claimed is:

1. A router for clearing overgrowth from a ditch, comprising:

a generally horizontal drive shaft having two ends and a center portion;

a plurality of axially spaced discs carried by said shaft for rotation therewith with said discs being of a progressively smaller diameter from the center portion of said shaft outwardly to each of the shaft ends;

cutting means attached to said discs for cutting said overgrowth when said discs are rotated;

said discs and said cutting means being operable in response to rotation of said drive shaft to clear said overgrowth when said shaft is moved along and through the ditch; and means for mounting said drive shaft to a motive power unit movable in a forward direction, said mounting means mounting said drive shaft in a generally horizontal plane with said drive shaft extending in a direction to one side and rearward relative to said motive power unit when viewed in plan to enable said drive shaft to be moved along and through said ditch at an oblique angle to the length of said ditch as said motive power unit is moved in the forward direction along side said ditch.

2. The router of claim 1 wherein said cutting means comprises a plurality of teeth spaced about and secured to the peripheries of said discs and a plurality of spaced teeth secured to the sides of said discs adjacent the peripheries thereof.

3. The router of claim 2 further comprising support means between said discs and shaft to resist lateral loads acting on said discs.

* * * * *